(12) United States Patent
Farnham (10) Patent No.: US 7,443,817 B2
(45) Date of Patent: Oct. 28, 2008

(54) AUTOMATIC WIRELESS CONNECTION SELECTION

(75) Inventor: Timothy David Farnham, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 514 days.

(21) Appl. No.: 10/778,071

(22) Filed: Feb. 17, 2004

(65) Prior Publication Data

US 2004/0233868 A1 Nov. 25, 2004

(30) Foreign Application Priority Data

Feb. 21, 2003 (GB) ................................. 0304019.3

(51) Int. Cl.
*H04Q 7/00* (2006.01)
(52) U.S. Cl. .................. 370/329; 370/395.21; 370/468; 455/452.1; 455/436; 455/448
(58) Field of Classification Search ................. 370/329, 370/395.21, 395, 468; 455/450, 436, 448, 455/452.1
See application file for complete search history.

(56) References Cited

U.S. PATENT DOCUMENTS

| | | | | |
|---|---|---|---|---|
| 5,471,645 A | * | 11/1995 | Felix | ............................ 455/516 |
| 6,122,514 A | * | 9/2000 | Spaur et al. | .................. 455/448 |
| 6,542,742 B2 | * | 4/2003 | Schramm et al. | ............. 455/436 |
| 6,745,172 B1 | * | 6/2004 | Mancisidor et al. | ........... 706/60 |

FOREIGN PATENT DOCUMENTS

| | | |
|---|---|---|
| GB | 2 346 507 A | 8/2000 |
| WO | WO 94/08431 | 4/1994 |
| WO | WO 98/29975 | 7/1998 |
| WO | WO 99/51052 | 10/1999 |

* cited by examiner

*Primary Examiner*—Nick Corsaro
*Assistant Examiner*—Dung Lam
(74) *Attorney, Agent, or Firm*—Oblon, Spivak, McClelland, Maier & Neustadt, P.C.

(57) ABSTRACT

The present invention relates to wireless communications systems, and in particular the selection of one or more available wireless connections suitable for use with a desired service or set of services. The present invention provides a method of and apparatus for selecting one or more wireless connections from a plurality of available wireless connections between a mobile terminal and one or more base stations for a service requested by a user of the terminal or base stations, the method comprising: determining one or more connection characteristics for each said available connection; determining a utility value for each said available connection; selecting one or more said connections based on said determined utility values; wherein each said connection utility value for a said available connection is based on the acceptability for said service of the determined connection characteristics for that connection according to a fuzzy logic determination.

17 Claims, 6 Drawing Sheets

AUTOMATIC WIRELESS CONNECTION SELECTION

FIELD OF THE INVENTION

The present invention relates to wireless communications systems, and in particular the selection of one or more available wireless connections suitable for use with a desired service or set of services.

BACKGROUND OF THE INVENTION

New mobile terminals, especially mobile phones, are capable of utilising more than one wireless connection at a time. For example a voice call over a GSM circuit switched connection may be carried out at the same time as reminders and contact details stored in the phone are updated by a PDA using a Bluetooth connection. Such terminals may also allow a particular service such as downloading emails to be carried out using one of two or more wireless connection options, for example the GSM circuit switched connection or a GPRS packet switched connection. The user selects what appears to be the most appropriate connection, perhaps based on minimising cost or speed of download.

Mobile terminals of the future may offer the user a number of simultaneous services such as voice calls, SMS, web-surfing and email retrieval, as well as video conferencing. However it is difficult for a user of a mobile terminal to judge which is the best connection option for the service they are interested in.

SUMMARY OF THE INVENTION

In general terms the present invention provides a method of automatically selecting one or more available wireless connections for one or more services requested by a user.

The method utilises fuzzy logic to divide possible connection characteristics for each available connection for each type of requested service into a number of fuzzy sets or groups representing different levels of performance, acceptability or quality for each characteristic/service pair. A utility factor may be assigned to each group of each connection characteristic/service pair depending on user preferences for the performance or quality each represents to the user. The actual connection characteristic values for each connection are determined, for example by measurement or estimation, and the utility for each group based on these values is calculated. Optionally, a weighting factor can be incorporated into some or all of the connection characteristics to make them more important due to for example temporary terminal or network conditions. The aggregate utility is determined for each connection by adding the utilities for each group for each connection. Based on this, one or more of the connections are selected for the requested services.

This allows an optimum connection decision to be made automatically despite the fact that the criteria for selection are ambiguous, sometimes contradictory and vague, and/or involve a complex combination of different factors. This reduces the burden on the user to select the best connection for his service needs, and allows a connection decision to be made even where there is no deterministic method of computing the optimum decision. Furthermore, this approach requires no training and can be easily adapted as new connections and services are introduced.

In particular, in one aspect the present invention provides a method of selecting one or more available wireless connections from a plurality of said connection between a mobile terminal and one or more base stations for a service requested by a user of the terminal or base stations, the method comprising: determining one or more connection characteristics for each said connection; determining a utility value for each said connection; selecting one or more said connections based on said determined utility values; wherein each said connection utility value for a said connection is based on the acceptability for said service of the combination of the determined connection characteristics for that connection, preferably according to a fuzzy logic determination.

Preferably the determining the connection utility values comprises determining one or more fuzzy sets having membership functions for each said connection characteristic for each said connection, said sets representing different levels of acceptability of the corresponding connection for said service; determining a utility value for each connection characteristic for each connection according to corresponding fuzzy sets depending on the determined connection characteristic for that connection; and aggregating said determined connection characteristic utility values for each connection in order to provide the connection utility value for each said connection.

User preferences may be accommodated by allocating a different utility factor to the membership functions of each fuzzy group in order to influence the connection characteristic utility values.

Similarly temporary network and terminal conditions such as low battery may be accommodated by allocating a weighting factor to the membership functions of each fuzzy group in order to influence the connection characteristic utility values.

The fuzzy set membership functions themselves may be retrieved from local storage or from a web-site for example.

The method may be implemented in many ways, including determining a suitable connection for a requested service; determining a suitable connection for a plurality of requested services; and determining a group of connections for a plurality of requested services.

The method is preferably implemented in a mobile terminal and/or a base station. The implementation may be by software, or a hardware accelerator such as an ASIC for example.

Examples of service types include "voice calls", "email transfer", "SMS", "web surfing", and "video conference". Examples of wireless connections include "GSM circuit switched", "GPRS", "SMS data", "Bluetooth", and "IEEE802.11". Examples of connection characteristics include "cost", "latency", "throughput", and "power consumption". Examples of fuzzy groups of connection characteristics for each service type include "good", "ok", and "bad". Each fuzzy set contains membership functions related to possible values of the connection characteristic. An example of a factor affecting weighting is low battery levels which will increase the importance of the power consumption characteristic in the decision-making process. User preference related utility factors may be expressed as a multiplier for each fuzzy set for a particular connection characteristic (/service pair); for example (5, 3, 0) for (Good, Ok, Bad) fuzzy sets.

BRIEF DESCRIPTION OF THE DRAWINGS

Embodiments are now described with reference to the following drawings, by way of example only and without intending to be limiting, in which.

DETAILED DESCRIPTION

Figure 1:
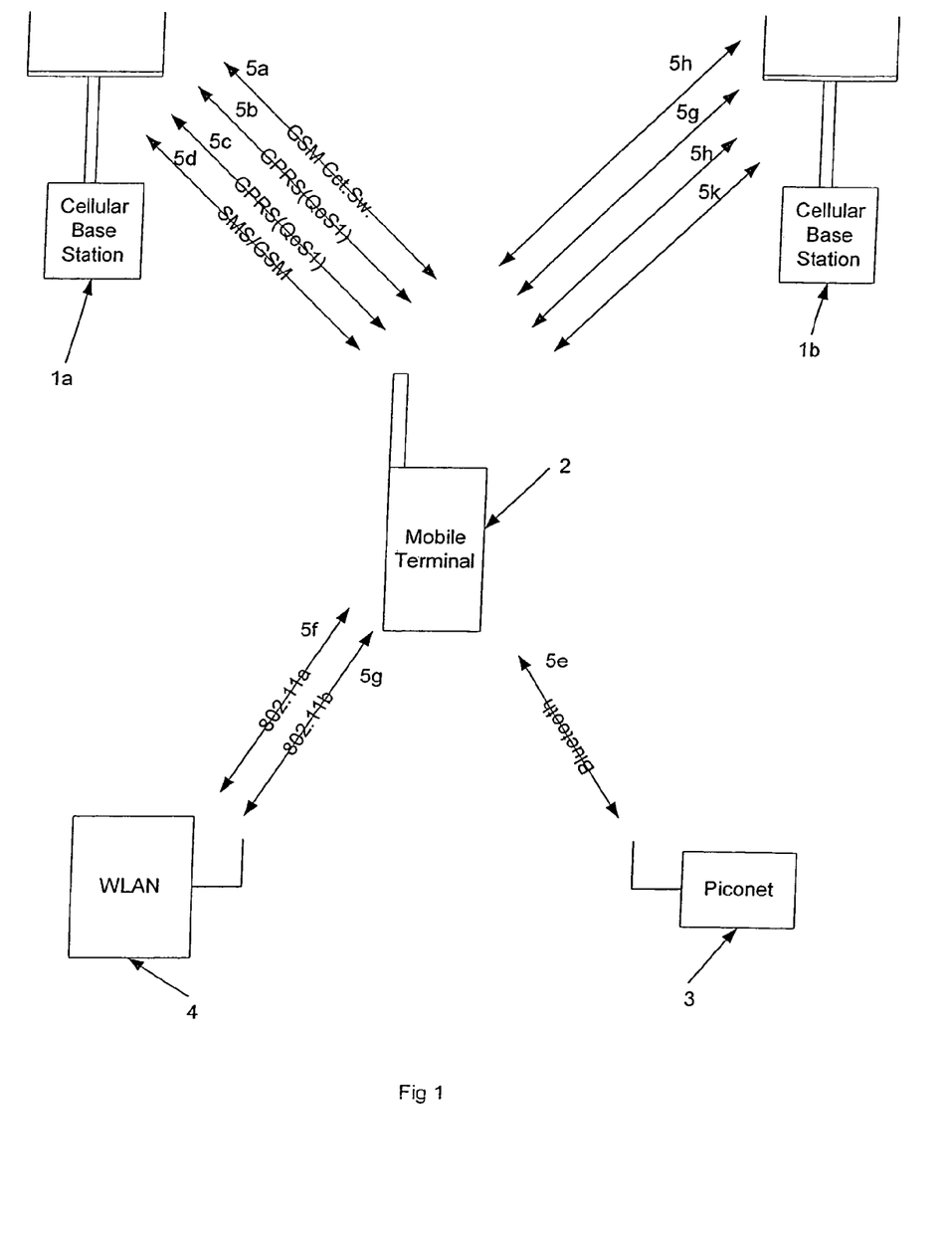
FIG. 1 is a schematic of a mobile terminal and several possible connections to wireless service provider base stations.

FIG. 1 shows a mobile terminal 2 such as a laptop computer, PDA, or mobile phone having the option of connecting to a number of wireless service providers using different types of wireless connections over different or the same radio access technologies.

Base stations 1a and 1b correspond to cellular networks such as GSM or CDMA based networks, each corresponding to a different operator. In the example shown, one of the base stations 1a offers a number of different connection types 5, in this case a standard GSM circuit switched connection 5a (this could be half or full rate voice), two different Quality of Service (QoS) levels of GPRS connections 5b and 5c, and a Short Messaging Service (SMS) data connection 5d. The other base station 1b also offers the same connection options 5h-5k, but from a different provider who may offer different charging rates on some connections than the first base station's operator. The connection qualities or characteristics may also be different for example because of differing distances between the mobile 2 and the two base stations 1a and 1b.

A nearby wireless piconet base station 3 is also available to the mobile 2, and offers a Bluetooth connection 5e. Finally a local WLAN base station 4 offers an IEEE802.11a connection 5f and an IEEE802.11b connection 5g to the mobile 2.

In prior art terminals which provide for multiple connection possibilities, the choice of connection is either dictated by the application, for example SMS, or must be selected by the user of the mobile 2. However the applicant's have recognised that such a selection procedure is not optimal, as it is difficult for a user to determine which is the best connection option based on multiple selection criteria such as cost and quality of service, and how each service type affects the importance of these criteria.

Mobile terminals of the future may offer the user a number of services such as voice calls, SMS, web-surfing and email retrieval, as well as video conferencing. However these different types of services are affected by differing amounts by the characteristics of a connection. For example, video conferencing and voice calls cannot tolerate high levels of latency within the connection, but do not require absolute accuracy of data transfer. By contrast, email download can tolerate significant latency, but not inaccuracy of data transfer as might occur on a high interference channel for example. Thus the requirements for selecting the optimum connection for a particular service can be conflicting, and are certainly complex and not easily determined by brief user analysis prior to starting a call or service.

Figure 2:
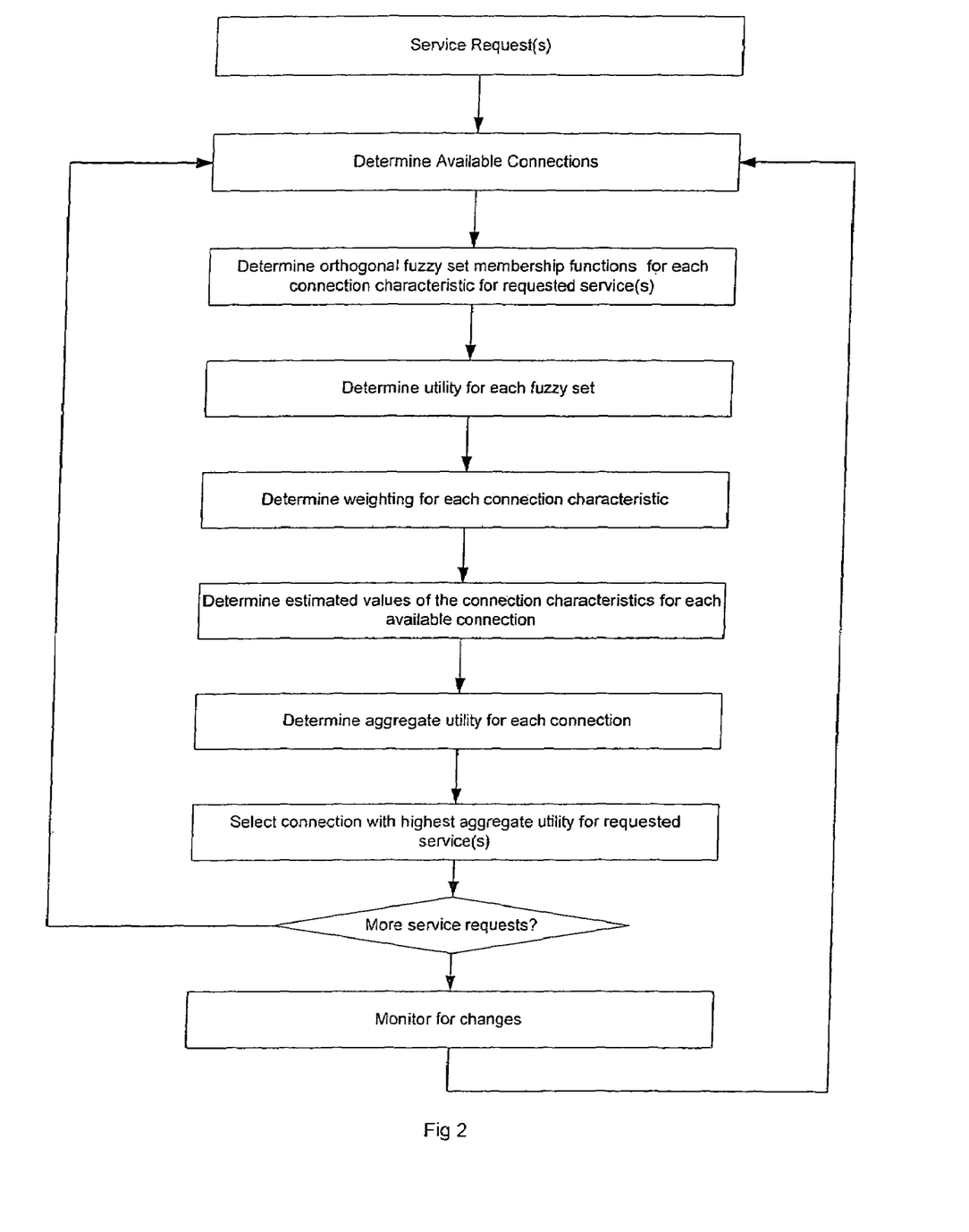
FIG. 2 is a flow chart of a method of an embodiment.

A flow chart for an embodiment providing automatic selection is shown in FIG. 2. A user of a mobile terminal 2 requests a connection service(s), for example a voice call. The terminal 2 then determines which connections 5 are available, for example connections 5a-5k as shown in FIG. 1. Which connections are available may depend on the requested service type which may not be supported by some connection types. For example a voice call may be supported by the GSM circuit switched connection 5a, and by using Voice over IP the GPRS1 and GPRS2 connections 5b and 5c, but not the SMS data channel 5d.

The terminal 2 then determines fuzzy set membership functions for the (or each) requested service for a number of common connection characteristics; for example cost, latency, throughput, and power consumption.

Fuzzy set membership functions for each of these characteristics for a voice call are shown in FIGS. 3a-3d. Other common connection characteristics could also or alternatively by used, for example delay variation or resource (processing / memory) requirements to realise the connection. A number of orthogonal fuzzy sets are determined with respect to possible values of each connection characteristic to allow the characteristics to be rated in terms of comparable quantities that can ultimately be used to determine the suitability (or utility) of choosing a connection for a particular service (or set of services). The set membership functions then define how connection characteristic value or level will impact on that service in a quantifiable way. The orthogonal fuzzy sets could represent "Good", "OK" and "Bad" in terms of suitability.

For example a latency level of 200 (milliseconds) and below might be considered necessary for "good" QoS on a video conference, and 150 to 300 sufficient for "OK" QoS. However, for email download, less than 900 ms would be "good", with say more than 1000 considered "bad".

Note the overlap of the orthogonal fuzzy sets. This is typical of fuzzy logic which recognises that decisions in the real-world are not made in a binary manner, but that the boundary between say good and ok or bad QoS are blurred. However, to maintain orthogonality the total membership value can never exceed unity.

For simplicity, three orthogonal fuzzy sets—"good"; "ok"; and "bad" —are discussed with respect to each connection characteristic. However, different numbers of sets may be used for different characteristic/service pairs. For example, just two fuzzy groups "good" and "okay" may be used with respect to latency for a background email download service, as generally this characteristic is not important for this service, and so all latencies are "okay". It is also possible to only have one membership function set "good" when it is not possible to determine a finer level of granularity in a characteristic. For example, if a service is absolutely essential the cost may be deemed to be "good" whatever it actually is.

Thus for each service type, there are a number of orthogonal connection characteristic fuzzy sets corresponding to the suitability of different connection characteristic values, for each service/connection pair. A discrete numerical representation of the orthogonal fuzzy sets for the cost characteristic of FIG. 3a is shown below, with samples taken at intervals of 20.

| | |
|---|---|
| Good Cost = | {1.0, 0.6, 0.3, 0, 0, 0, 0, 0, 0, 0} |
| OK Cost = | {0, 0.4, 0.7, 1.0, 0.7, 0.4, 0, 0, 0, 0} |
| Bad Cost = | {0, 0, 0, 0, 0.3, 0.6, 1.0, 1.0, 1.0, 1.0} |
| x values (pence/min) = | 20, 40, 60, 80, 100, 120, 140, 160, 180, 200 |

The fuzzy sets of connection characteristics for each service type are normally predetermined and for example either stored locally within the terminal 2, or could be forwarded to the terminal 2 from a provider of wireless connections (base stations 1a, 1b, 3, 4) or other parties involved in a service upon request. When a caller is attempting to connect with the mobile terminal, the sets could be forwarded via the various base stations 1a, 1b, 3, 4 shown in FIG. 1 from the other parties or the service provider. Preferably they are available from web-sites associated with the requested service. Alternatively some of the information required for determining the fuzzy sets could be computed dynamically.

The fuzzy set membership functions will typically initially be defined by the service provider or application developer of the service. They could be available on web sites, forwarded by the service provider (eg the connecting base station), or embedded into the application software, or pre-stored in local memory in the terminal 2. However, it is possible that the user can modify these, for example more advanced users may want to fine-tune the selection procedure. Also, users may be presented with a number of different profiles. For example a "low cost" profile or "high quality" profile. These may be selected by the end-user.

Once the fuzzy sets for each connection characteristic of the requested service are determined (typically by retrieval from local storage or receiving them via the base station from a web site), the mobile terminal 2 determines utility factors or values for each orthogonal fuzzy set. The utility values represent user preferences in terms of the value (or utility) that they would gain from having an outcome that falls in that category. For example a user who only wants good quality voice and video calls (for example due to poor hearing) may assign 9 out of a possible utility rating of 10 to the "good" fuzzy set for parameters of connection characteristics that will affect this, for example latency and throughput. Similarly, a user who travels a lot between re-charging the battery of his mobile terminal may put a premium on low power consumption, for example by assigning utilities as follows: U(P(good, ok, bad))=(9, 5, 0) for all service types. If he is less concerned about voice quality and email download speed, he may assign utilities as follows: (5, 3, 1) for latency for voice calls and (2, 1, 0) for throughput for email transfer. These utilities or user preferences may be changed by the user depending on his circumstances, for example if he is going on holiday power consumption may become more important. The utilities may also be changed indirectly by the user selecting different "profiles", for example a "business" or "personal" profile. These utility factors essentially de-orthogonalise the fuzzy sets and bias those most suited to the user's preferences in order to influence the decision making process.

The mobile terminal also determines a weighting factor for each connection characteristic for the service type. This represents the importance of the respective characteristic at the time of the service request due to changing circumstances, especially those related to operation of the terminal or the network. For example, a higher than unity weighting factor may be applied to the power consumption characteristic when the battery is running low, as power consumption is a more significant consideration under these circumstances. Similarly, memory or processing resources may become scarce in which case the weighting of the connection characteristics important for memory or processing requirements may be increased.

The mobile terminal 2 then determines values for the connection characteristics (cost, latency, throughput, power consumption) for each of the available connections. This may be done by measurement, querying the respective base station, and/or by estimation as is known in the art.

Once all of these parameters have been determined, the aggregate utility for each available connection for the requested service is calculated. This may be done by the mobile terminal 2, or by the base station. A partial calculation is shown below to illustrate this:

A. For "voice call" service:
1. Determination fuzzy Sets for each connection characteristic:
   (x) Cost:
     Mx(Good) = {1.0, 0.6, 0.3, 0, 0, 0, 0, 0, 0, 0}
     Mx(OK) = {0, 0.4, 0.7, 1.0, 0.7, 0.4, 0, 0, 0, 0}
     Mx(Bad) = {0, 0, 0, 0, 0.3, 0.6, 1.0, 1.0, 1.0, 1.0}
   (y) Latency:
     Ny(Good) = { . . . }
     Ny(OK) = { . . . }
     Ny(Bad) = { . . . }
   (z) Throughput:
     Oz(Good) = { . . . }
     Oz(OK) = { . . . }
     Oz(Bad) = { . . . }
   (w) Power consumption:
     Pw(Good) = { . . . }
     Pw(OK) = { . . . }
     Pw(Bad) = { . . . }
2. Determine set utilities for each connection characteristic:
   (x) Cost        Ux(good, ok, bad) =    (2, 1, 0)
   (y) Latency     Uy(good, ok, bad) =    (2, 1, 0)
   (z) Throughput  Uz(good, ok, bad) =    (2, 1, 0)
   (w) Pwr Con.    Uw(good, ok, bad) =    (2, 1, 0)
3. Determine weighting for each connection characteristic:
   (x) Cost        Wx = 1
   (y) Latency     Wy = 1
   (z) Throughput  Wz = 1
   (w) Pwr. Con.   Ww = 2
4. Determine connection characteristic estimates for each available connection:
   (a) For available connection 1):
     x = 60
     y = 250
     z = 145
     w = 500
   (b) - (n) Repeat for other available connection 2, 3, 4 . . .
5. Determine aggregate utility for each available connection:
   (a) For available connection 1):
     (x) For cost characteristic (x = 60):
       (i) MU(60)(good) = f(Mx(good)x)*Ux(good)*Wx
         = ({1.0, 0.6, 0.3, 0, 0, 0, 0, 0, 0, 0}(60))*2*1
         = 0.3*2*1
         = 0.6
       (ii) MU(60)(ok) = {0, 0.4, 0.7, 1.0, 0.7, 0.4, 0, 0, 0, 0}(60)*1*1
         = 0.7*1*1
         = 0.7
       (iii) MU(60)(bad) = {0, 0, 0, 0, 0.3, 0.6, 1, 1, 1, 1}(60)*0*1
         = 0*0*1
         = 0
       (iv) MU(60)(total) = 0.6 + 0.7 + 0
         = 1.3
     (y) For latency characteristic (y = 250):
       (i) NU(250)(good) = . . .
       .
       .
       (iv) NU(250)(tot) = . . .
     (z) For throughput characteristic (z = 145):
       (i) OU(145)(good) = . . .
       .
       .
       (iv) OU(145)(tot) = . . .
     (w) For power consumption characteristic (w = 500):
       (i) PU(500)(good) = . . .
       .
       .
       (iv) PU(500)(tot) = . . .
     T) Total utility for connection 1:
       U(1) = MU(60)(tot) + NU(250)(tot) + OU(145)(tot) + PU(500)(tot)
   (b) - (n) Repeat for other available connections 2, 3, 4 . . .
6. Select connection for service (voice call) based on highest total utility
B - ? Repeat for other services (eg email transfer and video streaming)

Note that following allocation of a service (eg voice call) to a particular connection, the determined characteristics (x, y, z, w) of this connection for another requested service (eg video streaming) may be different from that when determined for the allocated service. This is because use of this connection by the first service may affect some of its connection characteristics (for example its throughput and latency).

Figure 4:
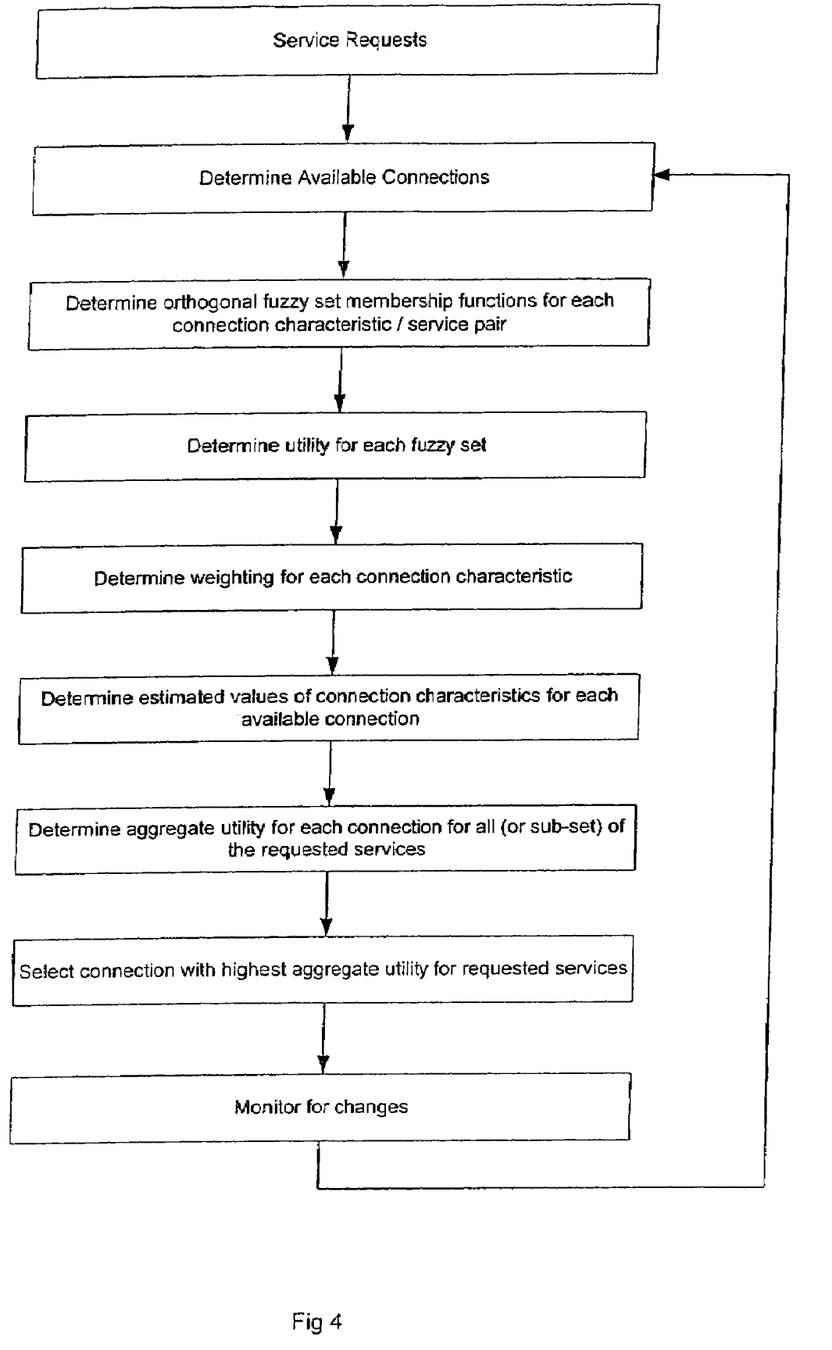
FIG. 4 is a flow chart of a method of another embodiment.

The method also monitors for any changes to the services requested (for example the completion of a voice call or email transfer) as well as the connection characteristics (for example a particular connections latency, throughput, signal to noise ratio or bit error rate, or the termination of a connection). If any of these parameters change more than a predetermined threshold, the method re-performs the selection process and if necessary adjusts the connection for the requested service. If the user enters a new service request, for example for audio streaming, then the method performs the selection process for that service.

Where a number of services are requested, instead of sequentially selecting a connection for each as described above and illustrated in FIG. 2, the method may be configured to determine the total utility for each connection for all or a sub-set of the requested services. Thus all or a number of services (for example video conference, email download, web service connection) may be allocated to the same connection (for example GPRS1 5b or 802.11a 5g), depending on the calculated total connection utilities for each service combined. Such a method is shown in FIG. 4.

As with the embodiment of FIG. 2, this method determines the available connections. However instead of just determining the fuzzy sets for each connection characteristic for one requested service type, the method then determines fuzzy sets for each connection characteristic/service type pair, that is fuzzy sets for all of the requested service types. Utility and weighting factors are determined for each fuzzy set, and the connection characteristics for each available connection are also determined.

The method then determines the aggregate utility for each connection by adding the utilities retrieved from each fuzzy group with the determined corresponding connection characteristic values, and incorporating the appropriate utility and weighting factors as before. However the utilities for each connection are determined for each service, and combined to give a combined aggregate utility for all requested services for each connection. Then, as before, the connection with the highest aggregate utility for the combined services is selected.

For example, when a user is utilising a video conferencing service at the same time as downloading e-mails, the connection selection algorithm may select a GPRS connection 5b or 5c, the services utilising different protocols but sharing the same packet switched wireless channel or connection. Once the video conference is terminated, the connection selection is recalculated and the algorithm may determine that the WLAN 802.11b interface 5g is the most appropriate, and the email download is switched over to using the WLAN air interface.

Figure 5:
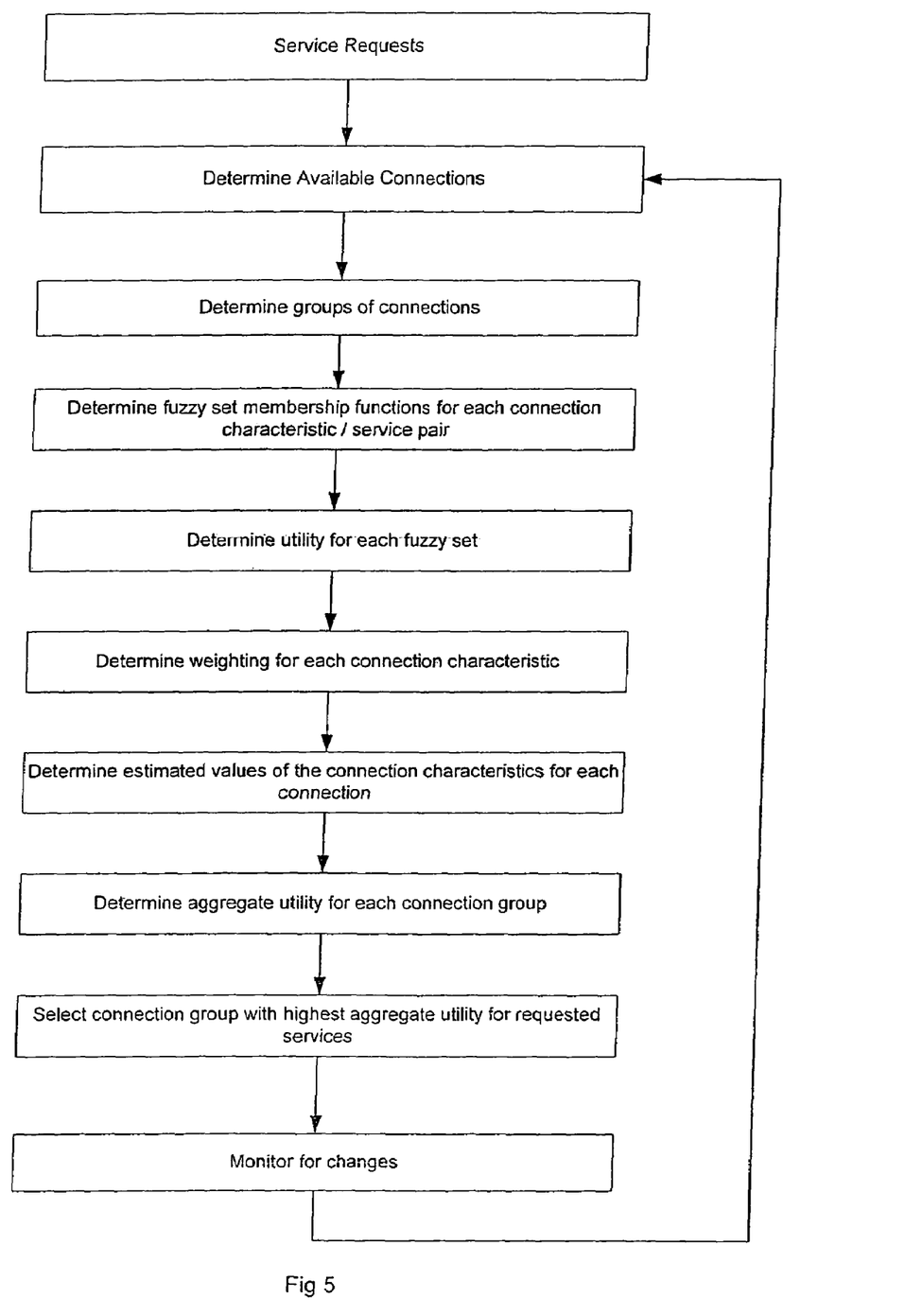
FIG. 5 is a flow chart of a method of a further embodiment.

In a further alternative configuration, where a number of services are requested, the method may be configured to determine a group of two or more connections with which to satisfy the requested services. In this case, a number of different groups of connections are determined, and the total utility of each group is determined with respect to the requested services. The group with the highest group utility is selected, and the corresponding connections enabled. Such a method is illustrated in FIG. 5

According to this method, following requests for services and determination of available connections, groups of these available connections are determined. The connections are grouped into mutually exclusive sets in order to take into account that some connections cannot operate simultaneously with other connections.

For example each time communication software or hardware is added to a device (or base station) the connection options that they provide can be advertised. This advertisement can be in the form of a registration of the capabilities or via a query process to discover the capabilities of the new modules. Then, the grouping can be performed based on information regarding the mutual exclusion or dependencies between these modes. For example, a new software module that provides a "very secure" Bluetooth connection may not co-exist with a module that provides a "low security" Bluetooth connection. Also some connections may depend on others. For example if a terminal is distributed between different physical devices it may be that one of these devices can use connection of the other device to access services. Therefore, there is a dependency relationship. In this case it is likely to be a Bluetooth connection from one device to the other and then a GPRS/UMTS/WLAN connection from the second device to the base station. Therefore, the groups in this case will contain elements from two subsets of connections, one which reflect the options for the connection between the two devices and one for the connection from the second device to the base station.

It is possible to eliminate any unfeasible combinations when forming valid groups (i.e. by observing the dependencies and mutual exclusions) and therefore the groups are really all combinations of different connections that can potentially support the services. It is envisioned that each software/hardware vendor will provide a software agent module that runs on the device (terminal or base station) or in the network (accessed via Internet/web site) and can be queried to determine these inter-dependencies. These agents must know which connections they require and also which connection options can not be used at the same time as the connections they provide. The simplest way to perform this group forming is then to obtain all available connections (obtained from the agents—or for agents to provide this automatically upon installation), for each connection to be selected in sequence from the set of all available connections and this forwarded as a dependency request to all the agents. Each agent responds with connections that depend on that requested (i.e. depend on the connection in the request). This can be repeated for mutual exclusions to identify which connections can not be used at the same time. Then the groups can be formed by all the valid combinations given the inter-dependency criteria.

Figure 3:
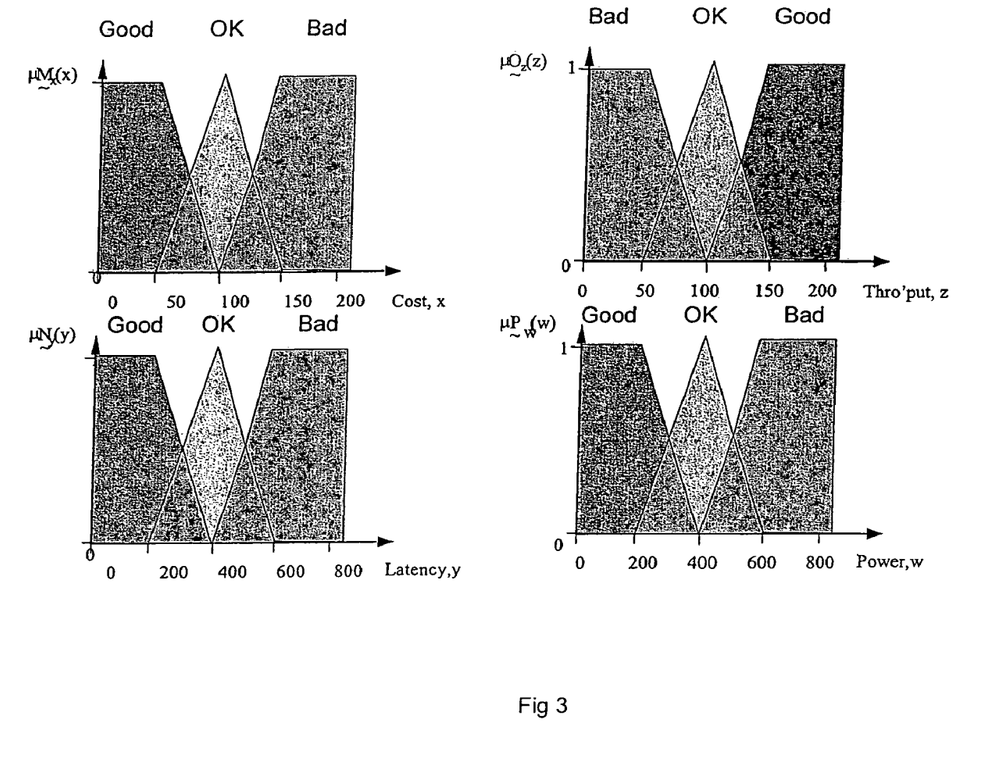
FIGS. 3a, 3b, 3c, and 3d show fuzzy sets for a number of connection characteristics for a particular service type.

Following determination of a number of groups of connections, the aggregate utility of each group with respect to the requested services is determined, and the group with the highest total utility is selected. The determination of aggregate utility has been described above with respect to a single service (FIG. 2) and a single connection for multiple services (FIG. 3).

For this embodiment, the aggregate utilities for each group are calculated in a similar manner to the previous embodiments. Again fuzzy sets are determined for each connection characteristic/request type, and connection characteristics are determined for each connection in a group. Then for each group of connections, the connection characteristic utilities are determined, incorporating utility and weighting factors, for each connection and service type combination in the group. These various utilities are added together to produce the aggregate utility for each group of connections.

Once the best group is selected, the best connections within that group with respect to the requested services can be determined and matched accordingly. For example a high bandwidth low latency connection is allocated to a video streaming service, whereas a narrowband connection is allocated to an SMS messaging service.

Aspects or parts of the three above described selection methods could also be combined in various ways. For example, for finding the best group of connections for multiple service requests, the best connection in each group is determined for each service, and then the sum of the utilities for these best connections in each group is aggregated. The selected group is then the one with the highest aggregate utility.

These selection approaches enable different and conflicting selection criteria based on connection characteristics to be compared for all the different combinations and the most appropriate connection or group of connections selected. As the service type requirements and user preferences for different connection characteristics are specified as utility adjusted fuzzy state membership functions, that are combined together, there is no risk of eliminating one connection simply because it is worse than the others in just one of these characteristics. The decision-making technique used is the fuzzy Bayesian method which is a technique that allows the uncertainty in the classification of connections with fuzzy criteria to be taken into account.

As already mentioned, the method can be applied to a mobile terminal 2 on which the user is requesting a number of services, and equally a base station 1a, 1b, 4, or 5 requesting connections for a number of services with a mobile terminal 2. Of course the terminal users preferences (utilities and weighting factors for each connection characteristic) may be different from preferences for the base stations. For example the terminal user may be interested primarily in minimising cost, whereas the base station may be interested in providing the best spectrum utilisation. Therefore, the base station may consider the spectrum utilisation efficiency characteristic of a connection as being much more important than other characteristics.

Figure 6:
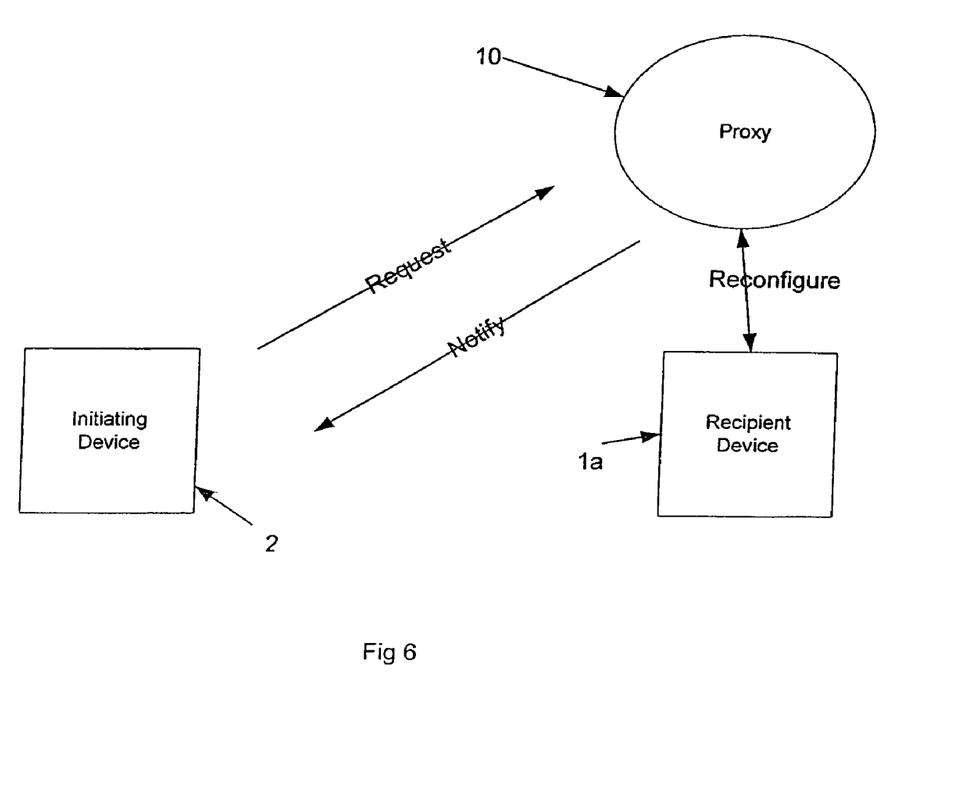
FIG. 6 is a schematic showing an implementation of an embodiment in a wireless network.

An example implementation of one of the methods in a communications system is illustrated in FIG. 6. An initiating device (eg mobile terminal 2) makes a request to establish a connection with a recipient device (eg base station 1a) to a proxy entity 10 acting on behalf of the recipient device 1a. The proxy entity is not essential in this scenario, but allows the decision making functionality to be placed in the network rather than on the terminal. The initiating device 2 sends the membership functions or fuzzy set values for the common connection characteristics for the requested service to the proxy 10 as part of the request, along with its utility and weighting factors. The proxy entity 10 computes the utilities for the available connections for the requested service(s) using the membership functions provided (as well as others provided by the recipient device), and combines the results with utilities for existing active services.

For example, if the initating device (for example the mobile terminal 2) is being charged for the connections then the cost characteristic fuzzy set membership functions are obtained from the initiating device 2 (for the requested services). However, the other characteristic membership functions should be obtained from the recipient device (base station 1a) for determining the best connection(s) for the recipient. The best connections are selected and the instruction to reconfigure the recipient and initiating devices are issued.

If the initiating device were the base station 1a, then either it will send the non-cost characteristic fuzzy membership functions to the terminal 2 which then performs the utility calculations to determine the best connection or group of connections. Alternatively, the base station 1a may simply request cost characteristic fuzzy membership functions from the terminal 2 and determine the best connection(s) itself.

It is likely that the cost and power consumption connection characteristic fuzzy set membership functions will be provided by the mobile terminal 2, while other connections characteristics such as latency and throughput will be provided by the base stations 1a, 1b, 3, or 4.

Embodiments of the invention may be implemented on a programmable processing apparatus such as a computer, or a processor. Methods in accordance with embodiments of the invention may be embodied as computer readable code carried on a carrier medium which could be a transient carrier such as a signal or a storage carrier such as memory. These methods may also be embodied as specifically configured apparatus such as an ASIC or a programmable logic gate array.

Embodiments of the invention may also be implemented as manufacturing instructions to process such a specifically configured apparatus. For example this may be a hardware description language code such as a Verilog code which when run on an appropriate manufacturing process specifically configures a configurable apparatus such as an ASIC or programmable logic gate array to implement methods in accordance with embodiments of the invention. Implementation may also take the form of code which dynamically configures re-configurable apparatus such as re-programmable logic gate arrays to implement these methods described above and covered by the scope of the appended claims.

The invention has been described with reference to embodiments thereof. Alterations and modifications as would be obvious to those skilled in the art are intended to be incorporated herein.

The invention claimed is:

1. A method of selecting one or more wireless connections from a plurality of available wireless connections between a mobile terminal and one or more base stations for a service requested by a user of the terminal or base stations, the method comprising:
   determining one or more connection characteristics for each of said available connections;
   determining a utility value for each of said available connections; and
   selecting one or more of said connections based on said determined utility values,
   wherein each of said connection utility values for said available connections is based on the acceptability for said service of the determined connection characteristics for that connection, and
   wherein the step of determining the connection utility values comprises
      determining one or more fuzzy sets having membership functions for each of said connection characteristics for each of said connections, said fuzzy sets representing different levels of acceptability of the corresponding connection for said service;
      determining a utility value for each connection characteristic for each connection according to corresponding fuzzy sets and depending on the determined connection characteristic for that connection; and
      adding together said determined connection characteristic utility values for each connection in order to provide the total connection utility value for each said connection.

2. The method as claimed in claim 1, wherein the step of determining said characteristic utility value for a connection characteristic comprises:
   allocating a separate utility factor to the membership functions of each fuzzy set of said connection characteristic depending on user preferences.

3. The method as claimed in claim 1, wherein the step of determining said characteristic utility value for a connection characteristic comprises:
adding a weighting factor to the membership functions of the fuzzy sets of said connection characteristic depending on base station or terminal conditions.

4. The method as claimed in claim 1, wherein said step of determining fuzzy sets comprises:
retrieving pre-determined membership functions from local storage or from a web-site.

5. The method as claimed in claim 1, wherein when two or more services are requested by the user, a connection characteristic utility value is determined for each connection characteristic/service pair, and the connection characteristic utility value for each connection is determined by aggregating the connection characteristic utility values for corresponding pairs.

6. The method as claimed in claim 1, wherein the selecting step comprises selecting said connection having the highest connection utility value.

7. The method as claimed in claim 1, wherein two or more services are requested by the user and the method further comprises:
determining a number of groups of said connections;
determining a utility value for each of said group of connections,
wherein said selection is based on the utility values of said groups.

8. The method as claimed in claim 7, wherein the utility values for each said group are determined by:
determining and aggregating the highest connection utility values in the group for each service.

9. A computer-readable medium having embedded therein instructions for controlling a processor to carry out the method of claim 1.

10. An apparatus for selecting one or more wireless connections from a plurality of available wireless connections between a mobile terminal and one or more base stations for a service requested by a user of the terminal or base stations, the apparatus comprising:
a characteristics processor or software module configured to determine one or more connection characteristics for each of said available connections;
a utility processor or software module configured to determine a utility value for each of said available connections;
a selector configured to select one or more of said connections based on said determined utility values;
wherein the utility processor or software module includes
a first processor or software module configured to determine one or more fuzzy sets having membership functions for each of said connection characteristics for each of said connections, said fuzzy sets representing different levels of acceptability of the corresponding connection for said service;
a second processor or software module configured to determine a utility value for each connection characteristic for each connection according to corresponding fuzzy sets and depending on the determined connection characteristic for that connection; and
a third processor or software module configured to add together said determined connection characteristic utility values for each connection in order to provide the total connection utility value for each said connection.

11. The apparatus as claimed in claim 10, wherein said second processor or software module further comprises:
a processor or software module configured to allocate a separate utility factor to the membership functions of each fuzzy set of said connection characteristic depending on user preferences.

12. An apparatus as claimed in claim 10, wherein said second processor or software module further comprises:
a processor or software module configured to add a weighting factor to the membership functions of the fuzzy sets of said connection characteristic depending on base station or terminal conditions.

13. The apparatus as claimed in claim 10, wherein said first processor or software module comprises a processor or software module configured to retrieve pre-determined membership functions from local storage or from a web-site.

14. The apparatus as claimed in claim 10, further comprising:
a fourth processor or software module configured to determine a connection characteristic utility value for each connection characteristic/service pair when two or more services are requested by the user; and
a fifth processor or software module configured to determine the connection characteristic utility value for each connection which is arranged to aggregate the connection characteristic utility values for corresponding pairs.

15. The apparatus as claimed in claim 10, wherein said connection is selected as the connection having the highest connection utility value.

16. The apparatus as claimed in claim 10, further comprising:
a sixth processor or software module configured to determine a number of groups of said connections; and
a seventh processor or software module configured to determine a utility value for each of said group of connections,
wherein said selection is based on the utility values of said groups.

17. The apparatus as claimed in claim 16, wherein the seventh processor or software module comprises a processor or software module configured to determine and aggregate the highest connection utility values in the group for each service.

* * * * *